(12) United States Patent
Wang et al.

(10) Patent No.: US 9,744,829 B2
(45) Date of Patent: Aug. 29, 2017

(54) VEHICLE HVAC SYSTEM WITH CABIN VENTILATION WHILE PARKED

(71) Applicant: DELPHI TECHNOLOGIES, INC., Troy, MI (US)

(72) Inventors: Mingyu Wang, Amerst, NY (US); Debashis Ghosh, Williamsville, NY (US); Edward Wolfe, IV, Clarence Center, NY (US); Sourav Chowdhury, Lockport, NY (US); Timothy D. Craig, Williamsville, NY (US)

(73) Assignee: MAHLE International GmbH, Stuttgart (DE)

( * ) Notice: Subject to any disclaimer, the term of this patent is extended or adjusted under 35 U.S.C. 154(b) by 150 days.

(21) Appl. No.: 14/493,986

(22) Filed: Sep. 23, 2014

(65) Prior Publication Data
US 2016/0082809 A1 Mar. 24, 2016

(51) Int. Cl.
*B60H 1/00* (2006.01)
*B60H 1/24* (2006.01)

(52) U.S. Cl.
CPC ..... *B60H 1/00778* (2013.01); *B60H 1/00028* (2013.01); *B60H 1/00821* (2013.01); *B60H 1/248* (2013.01); *B60H 2001/00178* (2013.01)

(58) Field of Classification Search
CPC .. B60H 1/00; B60H 1/00735; B60H 1/00842; F24F 13/00
USPC .......................................... 454/139, 318, 78
See application file for complete search history.

(56) References Cited

U.S. PATENT DOCUMENTS

| | | | | |
|---|---|---|---|---|
| 4,155,221 A | * | 5/1979 | Dhoore | F04D 29/681 415/119 |
| 5,181,553 A | * | 1/1993 | Doi | B60H 1/00842 165/203 |
| 5,386,704 A | * | 2/1995 | Benedict | B60H 1/00392 454/161 |
| 5,669,813 A | * | 9/1997 | Jairazbhoy | B60H 1/00271 361/645 |
| 6,607,029 B2 | * | 8/2003 | Danieau | B60H 1/00021 165/203 |
| 7,967,063 B2 | * | 6/2011 | Sato | B60H 1/00664 137/630.14 |

(Continued)

FOREIGN PATENT DOCUMENTS

EP 1500534 A2 1/2005
JP 2005001539 A 1/2005

*Primary Examiner* — Steven B McAllister
*Assistant Examiner* — Samantha Miller
(74) *Attorney, Agent, or Firm* — Brinks Gilson & Lione

(57) ABSTRACT

A heating, ventilation, and air-conditioning (HVAC) system includes a blower, a fresh-air valve, a bypass duct, and a bypass valve. The blower is configured to urge air to flow from an inlet to an outlet of the blower. The fresh-air valve is operable to provide a mixture of air drawn from an outside-air duct and a recirculated-air duct to the inlet. The fresh-air valve is operable to a recirculate position where the outside-air duct is substantially blocked from communicating with the inlet. The bypass duct is configured to couple the outlet to the outside-air duct. The bypass valve is located in the bypass duct and is operable to a closed position and an open position. The cabin is ventilated when the fresh-air valve is in the recirculate position, the bypass valve is in the open position, and the blower is operated to blow air out of the outside-air duct.

7 Claims, 3 Drawing Sheets

(56) References Cited

U.S. PATENT DOCUMENTS

| | | | |
|---|---|---|---|
| 2005/0205351 A1* | 9/2005 | D'Angelo | F01N 1/00 181/216 |
| 2005/0279489 A1* | 12/2005 | Kushner | B60H 1/0005 165/203 |
| 2006/0199506 A1* | 9/2006 | Crocker | F24F 13/222 454/233 |
| 2008/0032618 A1* | 2/2008 | Katoh | B60H 1/00564 454/143 |
| 2009/0049853 A1* | 2/2009 | Araki | B60H 1/0005 62/244 |
| 2009/0071178 A1* | 3/2009 | Major | B60H 1/00278 62/239 |
| 2009/0209194 A1* | 8/2009 | Hurd | B60H 1/00064 454/261 |
| 2010/0120348 A1* | 5/2010 | Tanaka | B60H 1/00678 454/159 |
| 2010/0304654 A1* | 12/2010 | Kakizaki | B60H 1/00064 454/121 |
| 2011/0284183 A1* | 11/2011 | Yamashita | B60H 1/00678 165/63 |
| 2013/0288585 A1* | 10/2013 | Hoke | B60H 3/0616 454/75 |
| 2014/0045417 A1* | 2/2014 | Sakamoto | B60H 1/00028 454/143 |

\* cited by examiner

# VEHICLE HVAC SYSTEM WITH CABIN VENTILATION WHILE PARKED

TECHNICAL FIELD OF INVENTION

This disclosure generally relates to a heating, ventilation, and air-conditioning (HVAC) system configured to ventilate a cabin of a vehicle while the vehicle is parked, and more particularly relates to adding a bypass duct and bypass valve configured to allow air from the cabin to be blown out of the vehicle via an outside-air duct normally used to pass outside-air into the cabin.

BACKGROUND OF INVENTION

It is known that due to the so called Green House effect, a cabin of a vehicle can be subject to temperatures greater than seventy degrees Celsius (70° C.) while parked in sunlight. Such cabin temperatures cause significant discomfort to occupants of the vehicle when initially entering the cabin and during the initial driving period. For some vehicles, full cabin comfort may only be achieved after driving for thirty minutes. As such, a vehicle air conditioning system is typically sized with excess capacity in order to quickly cool the cabin to a comfortable temperature. However, the mechanical load of the air conditioning system running at maximum undesirably consumes excessive energy that reduces the driving range of a Battery Electrical Vehicle (BEV), or causes extra engine emissions by an Internal Combustion (IC) engine of a conventional vehicle.

Various techniques to ventilate the vehicle cabin during soak to reduce the cabin temperature have been proposed. During the late 1990s, National Renewable Energy Laboratory (NREL) demonstrated the effect cabin ventilation had on cabin temperature during hot soak conditions. In SAE Paper No. 2007-01-1194 by Rugh et al. of NREL, a bank of six ventilation fans were installed in the sunroof to provide cabin ventilation. However, the NREL configuration undesirably adds cost to the overall air conditioning system.

SUMMARY OF THE INVENTION

Described herein in an improvement to a typical HVAC system that allows the already existing blower to be operated in its normal direction (i.e. forward direction) to draw air out of the cabin via the already existing recirculated-air duct and expel or blow that air out of the already existing outside-air duct that is normally used to draw outside-air into the cabin. The improvement includes adding a bypass duct and a bypass valve in the bypass duct so the aforementioned already existing features can be cooperatively used to ventilate the cabin while the vehicle is parked.

In accordance with one embodiment, a heating, ventilation, and air-conditioning (HVAC) system configured to ventilate a cabin of a vehicle while the vehicle is parked is provided. The system includes a blower, a fresh-air valve, a bypass duct, and a bypass valve. The blower is configured to urge air to flow from an inlet of the blower to an outlet of the blower. The fresh-air valve is operable to provide a mixture of air drawn from an outside-air duct and a recirculated-air duct to the inlet. The fresh-air valve is operable to a recirculate position where the outside-air duct is substantially blocked such that substantially all air provided to the inlet is from the recirculated-air duct. The bypass duct is configured to couple the outlet to the outside-air duct. The bypass valve is located in the bypass duct and is operable to a closed position and an open position. The cabin is ventilated when the fresh-air valve is in the recirculate position, the bypass valve is in the open position, and the blower is operated. For this condition, air from the cabin is blown out of the outside-air duct.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
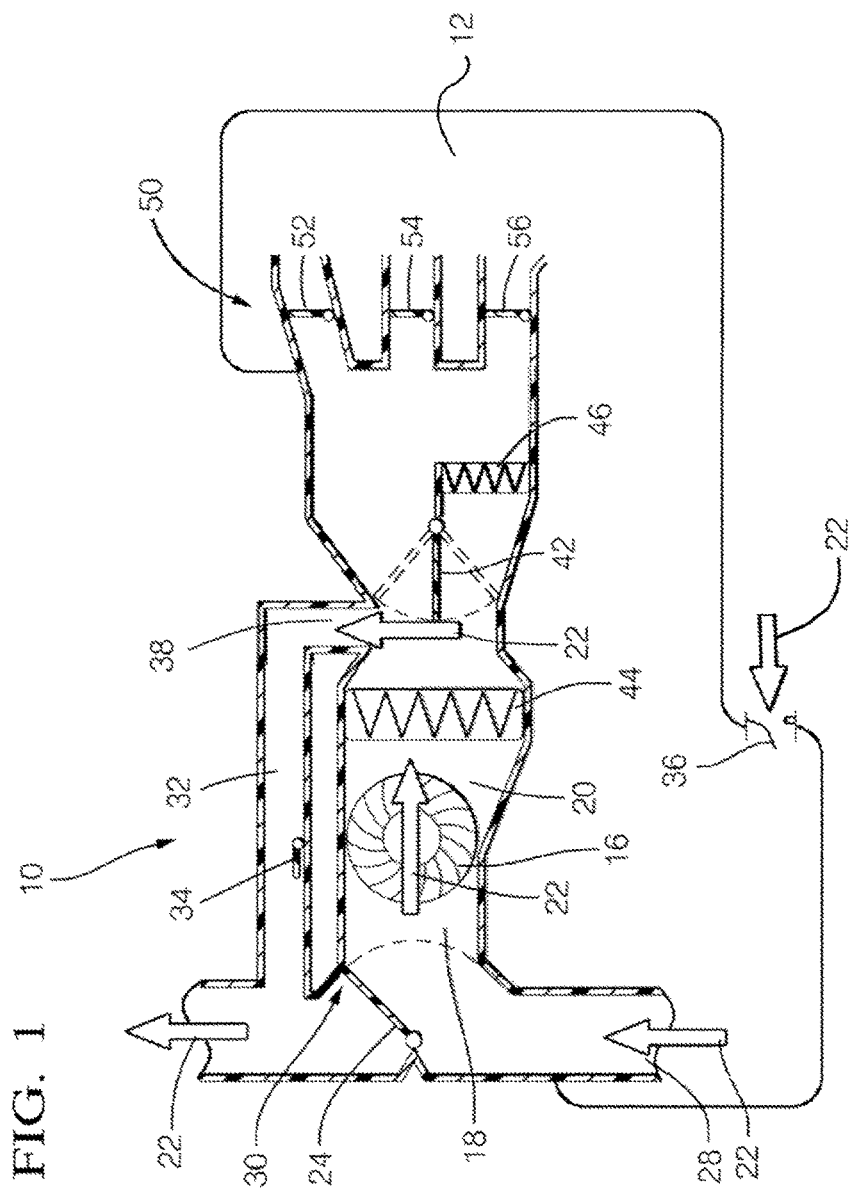
FIG. 1 is cross sectional view of an HVAC system configured to ventilate a cabin of a vehicle in accordance with one embodiment.

FIG. 1 illustrates a non-limiting example of a heating, ventilation, and air-conditioning (HVAC) system, hereafter referred to as the system 10. As will be explained in more detail below, the system 10 is advantageously configured to ventilate a cabin 12 of a vehicle (now shown, e.g. an automobile) while the vehicle is parked. As used herein, the cabin 12 is generally defined by the area within a vehicle where an operator and/or passenger of the vehicle reside. By ventilating the cabin 12 while the vehicle is parked, the uncomfortable condition of an operator entering or returning to a hot cabin that arises when a closed vehicle is parked in the sun can be avoided.

The system 10 includes a blower 16 configured to urge the air 22 to flow from an inlet 18 of the blower 16 to an outlet 20 of the blower 16. The blower 16 typically is a centrifugal type fan rotated by a motor. The centrifugal type fan is not well suited to operate in a reverse or backward manner in order to urge the air 22 to flow in a direction opposite of that illustrated. As such, it is not advantageous to operate the blower 16 in a reverse direction to ventilate the cabin. That is, as will be described in more detail below, when the blower 16 is operated, it means that the blower 16 is only operated in the normal or forward direction. For this reason, any HVAC system that ventilates a cabin by merely operating a fan in a reverse direction or opposite of normal direction is not comparable to the system 10 described herein.

The system 10 includes a fresh-air valve 24 operable to provide a mixture of air drawn from an outside-air duct 26 and a recirculated-air duct 28 to the inlet 18. The fresh-air valve 24 is often referred to as an 'air inlet valve' by those in the art. The term 'fresh-air valve' is used herein only to avoid confusion with the term 'inlet' as used to refer to the inlet 18. It is noted that the indicated direction of the air 22 flowing through the outside-air duct 26 is an outward direction. Those in the art will recognize that this is opposite of the direction expected when a typical HVAC system is operating. When the system 10 described herein is operated in normal manner, i.e. not in the special ventilation mode described herein to ventilate the cabin 12 while the vehicle is parked, the normal direction of the air 22 through the outside-air duct 26 would be opposite of that illustrated. However, when the system 10 is operated in the special ventilation mode that is designed to ventilate the cabin while the vehicle is parked, the air 22 flowing through the outside-air duct 26 will be in the direction illustrated, which is opposite of normal. That is, the system 10 advantageously uses the outside-air duct to draw outside-air into the cabin when operating in the normal mode, and to blow or expel air out of the cabin when operating in the special ventilation mode.

The fresh-air valve 24 is operable to a recirculate position 30 where the outside-air duct 26 is substantially blocked from communicating with the inlet 18 such that substantially all air provided to the inlet 18 is from the recirculated-air duct 28. As used herein, 'substantially all' means that some leakage around the fresh-air valve is contemplated, and that the presence of a bleed hole through the fresh-air valve is not excluded.

The system 10 advantageously includes a bypass duct 32 configured to couple the outlet 20 to the outside-air duct 26, and a bypass valve 34 located in the bypass duct 32. The bypass valve 34 is operable to a closed position or closed state that generally blocks airflow through the bypass duct 32. The bypass valve 34 is also operable to an open position as illustrated in FIG. 1 that allows the air 22 to flow through the bypass duct 32. The special ventilation mode introduced above is engaged, whereby the cabin 12 is ventilated, when a) the fresh-air valve 24 is in the recirculate position 30, b) the bypass valve 34 is in the open position as illustrated in FIG. 1, and c) the blower 16 is operated in a normal manner so the air 22 is urged from the inlet 18 to the outlet 20, whereby air from the cabin 12 is blown out of the outside-air duct 26 as shown by the orientations of the arrows used to indicate the air 22. It is emphasized that during operation in the special ventilation mode, the air 22 drawn into the recirculated-air duct 28 from the cabin 12 is expelled or blown out of the outside air duct 26, which is a direction of airflow that is opposite of the direction of that for an outside-air duct or fresh-air duct during normal operation of the system 10.

When the system 10 is operated in the special ventilation mode described herein, the cabin 12 needs to be replenished with air from outside of the vehicle. For some vehicles, natural occurring leaks around doors and windows may provide sufficient airflow so as to not inhibit the ventilation of the cabin. However, some vehicles may not have sufficient avenues for replenishing the cabin 12, so the system 10 may also include an equalization vent 36 configured to allow fresh air to replenish the cabin 12 when the cabin 12 is ventilated by the system 10 operating in the special ventilation mode described herein. By way of example and not limitation, the equalization vent may be a passive, one-way type vent that only allows airflow into the cabin 12. Such a passive vent would preferably be located on the vehicle where it would not experience a pressure difference that caused the air 22 to flow through the equalization vent 36 while the vehicle is being driven. Alternatively, the equalization vent may be an active valve comparable to the bypass valve 34 which would be opened during the special ventilation mode and closed during normal operation of the system 10 while, for example, the vehicle is being driven.

In one embodiment of the system 10, the bypass duct 32 defines an early bypass port 38. As used herein, the modifier 'early' is used to distinguish the relative location of the port in the system 10 from other positions such as that shown in FIG. 2 which shows a late bypass port 40 distinct from the early bypass port 38 shown in FIG. 1. As a point of reference, the system 10 includes a temperature control valve 42 located downstream of the outlet, and the early bypass port 38 is located to receive air from a region of the system 10 characterized as located between the outlet 20 and the temperature control valve 42. An advantage of the configuration shown in FIG. 1 is that the length of the bypass duct 32 is generally minimized when compared to the configuration of FIG. 2, so less volume of the cabin 12 is taken by the system 10. The system 10 may also include an evaporator 44 for cooling the air 22 and a heater core 46 for heating the air 22 as will be recognized by those in the art.

Figure 2:
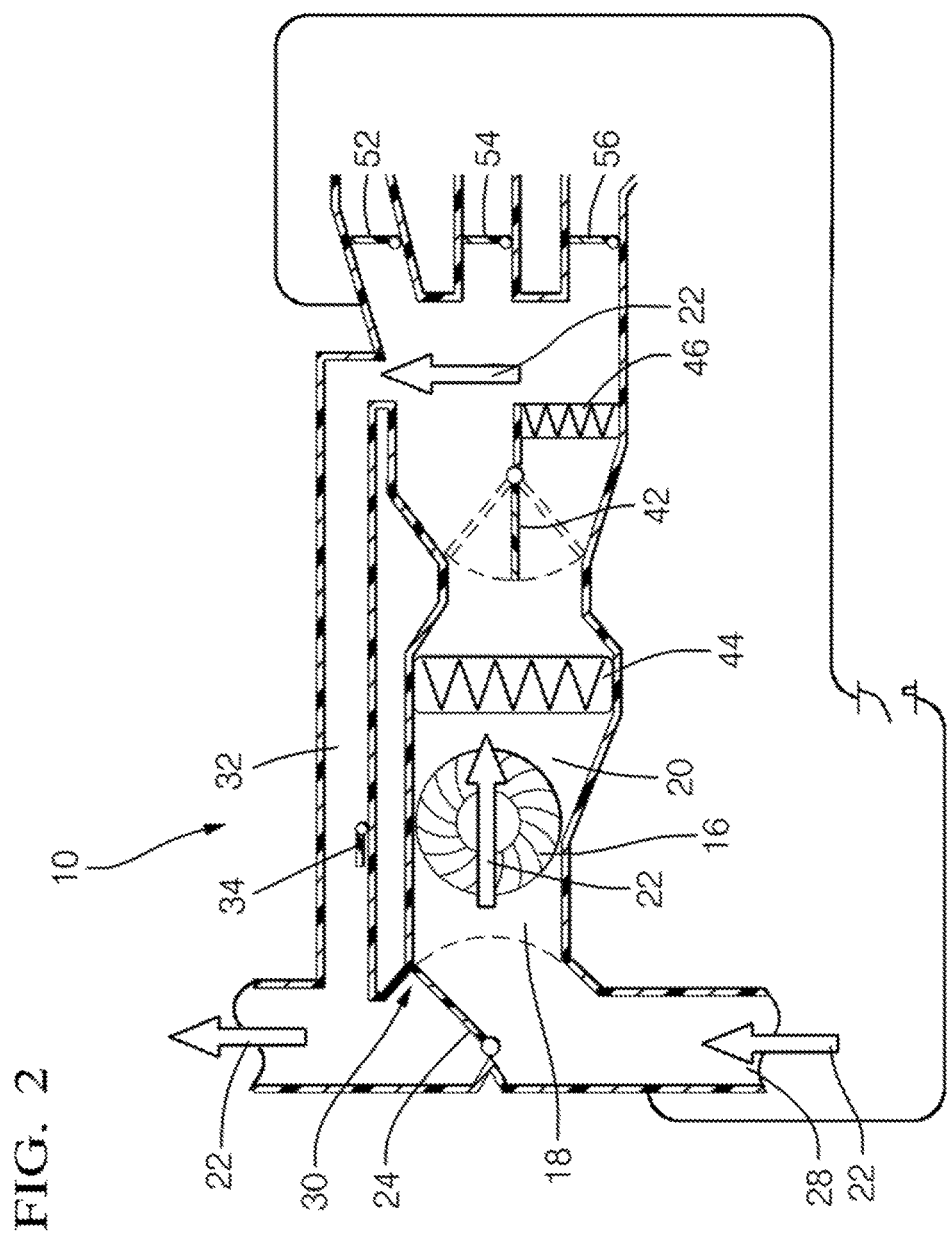
FIG. 2 is cross sectional view of an HVAC system configured to ventilate a cabin of a vehicle in accordance with one embodiment.

FIG. 2 illustrates a non-limiting example of an alternative embodiment of the system 10. In this embodiment, the bypass duct defines the late bypass port 40 at a location downstream of the temperature control valve. While this configuration may require a longer bypass duct and thereby occupy more volume of the cabin 12 than the configuration shown in FIG. 1, this configuration is advantageous as it helps to ventilate more of the system 10 when operated in the special ventilation mode. That is, more of the HVAC module that houses the blower 18 and the temperature control valve 42 will be ventilated and thereby avoid undesirable heating while the vehicle is parked.

Continuing to refer to FIGS. 1 and 2, the system 10 may include one or more cabin valves 50. By way of example and not limitation, the cabin valve 50 may include a defrost valve 52 that regulates airflow to a windshield, a vent valve 54 that regulates airflow to outlets on a dashboard, and a heat valve 56 that regulates airflow to a floor area of the cabin 12. As such, each of the cabin valves is operable to regulate airflow to the cabin through cabin vents (e.g. defrost vent, dashboard vent, floor vent) that correspond with the cabin valves 50. As shown in FIGS. 1 and 2, all of the cabin valves 50 are operated to a closed state as illustrated when the cabin is ventilated, i.e. the system 10 is operated in the special ventilation mode. Having all of the cabin valves closed is advantageous as the air 22 drawn via the recirculate duct 28 from the cabin will not return to the cabin through the cabin valves 50, thereby providing for the maximum amount of air expelled through the outside air duct 26.

Figure 3:
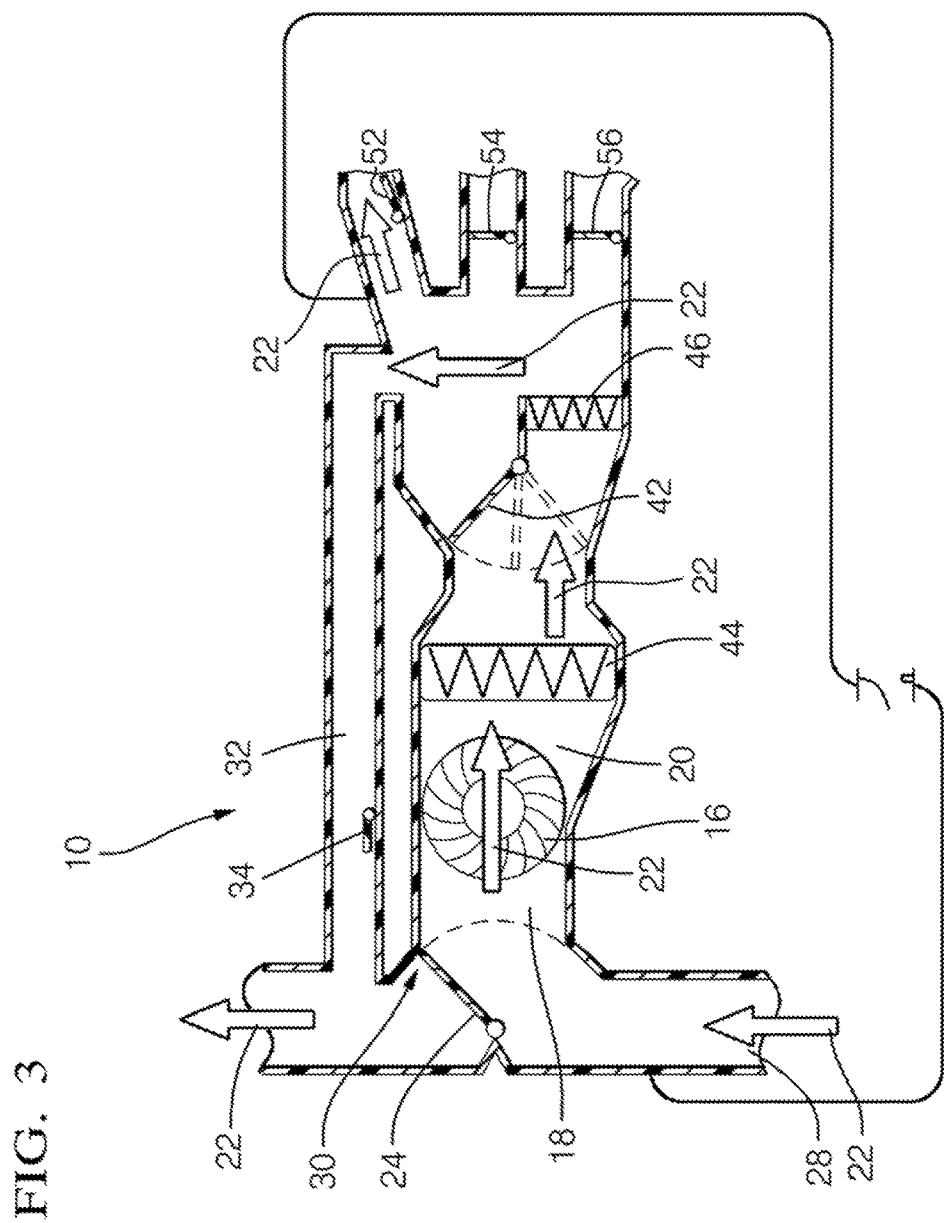
FIG. 3 is cross sectional view of the HVAC system of FIG. 2 operated in an alternative manner in accordance with one embodiment.

FIG. 3 shows a non-limiting example of an alternative way to operate the system 10 where one or more of the cabin valves 50 are operated away from a closed state when the cabin is ventilated. As used herein, the phrase 'away from a closed state' means that the various cabin valves can be partially open or fully open as desired. The advantage of operating one or more of the cabin valves 50 away from the closed state is that the ducts leading to the various vents are also kept cool. Furthermore, for the states of the control valves 50 illustrated, having the air 22 flow through defrost valve 52 will help to mix the air in the cabin to avoid stagnation of air near the roof of the cabin 12 so as to promote more uniform ventilated cabin temperature during park.

It is contemplated that the system 10 may include a solar panel (not shown) to keep the battery (not shown) of the vehicle charged if the cabin 12 is ventilated as described herein while the vehicle is parked and the engine is not running. It is also contemplated that the system 10 may include a cabin temperature sensor that is monitored by a controller (not shown) to determine when the special ventilation mode should be used. It is also contemplated that the system 10 may include a timer that the operator can set to indicate when the operator will return to the vehicle so the controller can avoid unnecessarily engaging the special ventilation mode when it is known that the operator will not return for a relatively long time. It is also contemplated that the system 10 may include or be in communication with a RF transceiver such as a cellular phone or ON-STAR® transceiver so the operator can communicate with the controller to begin ventilating the cabin because the return of the operator is imminent.

Accordingly, a heating, ventilation, and air-conditioning (HVAC) system (the system 10) configured to ventilate a cabin of a vehicle while the vehicle is parked is provided. The addition of the bypass duct 32 and the bypass valve 34 provides the means for the system 10 to engage the special ventilation mode describe herein to ventilate the cabin by drawing air from the cabin via the recirculation-air duct 28 and expelling that air via the outside air duct. If the cabin is ventilated, the system can more quickly achieve a comfortable temperature for the operator of the vehicle, and the maximum cooling capacity of the system 10 may be reduced when compared to HVAC systems that are not able to engage the special ventilation mode described herein.

While this invention has been described in terms of the preferred embodiments thereof, it is not intended to be so limited, but rather only to the extent set forth in the claims that follow.

We claim:

1. A heating, ventilation, and air-conditioning (HVAC) system configured to ventilate a cabin of a vehicle while the vehicle is parked, said system comprising:
    a blower configured to urge air to flow from an inlet of the blower to an outlet of the blower, the outlet of the blower being upstream of a heater;
    a fresh-air valve operable to provide a mixture of air drawn from an outside-air duct and a recirculated-air duct to the inlet, wherein the fresh-air valve is operable to a recirculate position where the outside-air duct is substantially blocked such that substantially all air provided to the inlet is from the recirculated-air duct; a bypass duct configured to couple the outlet to the same outside-air duct, from which the outside air is provided to the inlet of the blower; and a bypass valve located in the bypass duct and operable to a closed position and an open position, wherein the cabin is ventilated when the fresh-air valve is in the recirculate position, the bypass valve is in the open position, and the blower is operated, whereby air from the cabin is blown out of the outside-air duct, wherein the system has a setting, in which substantially all air blown out of the system is-blown out of the same outside-air duct, from which the outside air is provided to the inlet of the blower,
    wherein the bypass duct defines an early bypass port, the system includes a separate temperature control valve located downstream of the outlet, the temperature control valve directing a portion of the air from the blower outlet through a heater and another portion of the air from the blower outlet around the heater, and the early bypass port is located to receive air from between the outlet and the temperature control valve.

2. The system in accordance with claim 1, wherein the system includes an equalization vent configured to allow fresh air to replenish the cabin when the cabin is ventilated.

3. The system in accordance with claim 1, wherein the system includes one or more cabin valves, each of the cabin valves operable to regulate airflow to the cabin through cabin vents that correspond with the cabin valves, and the all of the cabin valves are operated to a closed state when the cabin is ventilated.

4. The system in accordance with claim 1, wherein the system includes one or more cabin valves, each of the cabin valves operable to regulate airflow to the cabin through cabin vents that correspond with the cabin valves, and one or more of the cabin valves are operated away from a closed state when the cabin is ventilated.

5. A heating, ventilation, and air-conditioning (HVAC) system configured to ventilate a cabin of a vehicle while the vehicle is parked, said system comprising:
    a blower configured to urge air to flow from an inlet of the blower to an outlet of the blower, the outlet of the blower being upstream of a heater;
    a fresh-air valve operable to provide a mixture of air drawn from an outside-air duct and a recirculated-air duct to the inlet, wherein the fresh-air valve is operable to a recirculate position where the outside-air duct is substantially blocked such that substantially all air provided to the inlet is from the recirculated-air duct; a bypass duct configured to couple the outlet to the same outside-air duct, from which the outside air is provided to the inlet of the blower; and a bypass valve located in the bypass duct and operable to a closed position and an open position, wherein the cabin is ventilated when the fresh-air valve is in the recirculate position, the bypass valve is in the open position, and the blower is operated, whereby air from the cabin is blown out of the outside-air duct, wherein the system has a setting, in which substantially all air blown out of the system is-blown out of the same outside-air duct, from which the outside air is provided to the inlet of the blower,
    wherein the bypass duct defines a late bypass port, the system includes a separate temperature control valve located downstream of the outlet, the temperature control valve directing a portion of the air from the blower outlet through a heater and another portion of the air from the blower outlet around the heater, and the late bypass port is located to receive air from downstream of the temperature control valve.

6. The system in accordance with claim 5, wherein the system includes an equalization vent configured to allow fresh air to replenish the cabin when the cabin is ventilated.

7. The system in accordance with claim 5, wherein the system includes one or more cabin valves, each of the cabin valves operable to regulate airflow to the cabin through cabin vents that correspond with the cabin valves, and the all of the cabin valves are operated to a closed state when the cabin is ventilated.

* * * * *